Patented Feb. 21, 1950

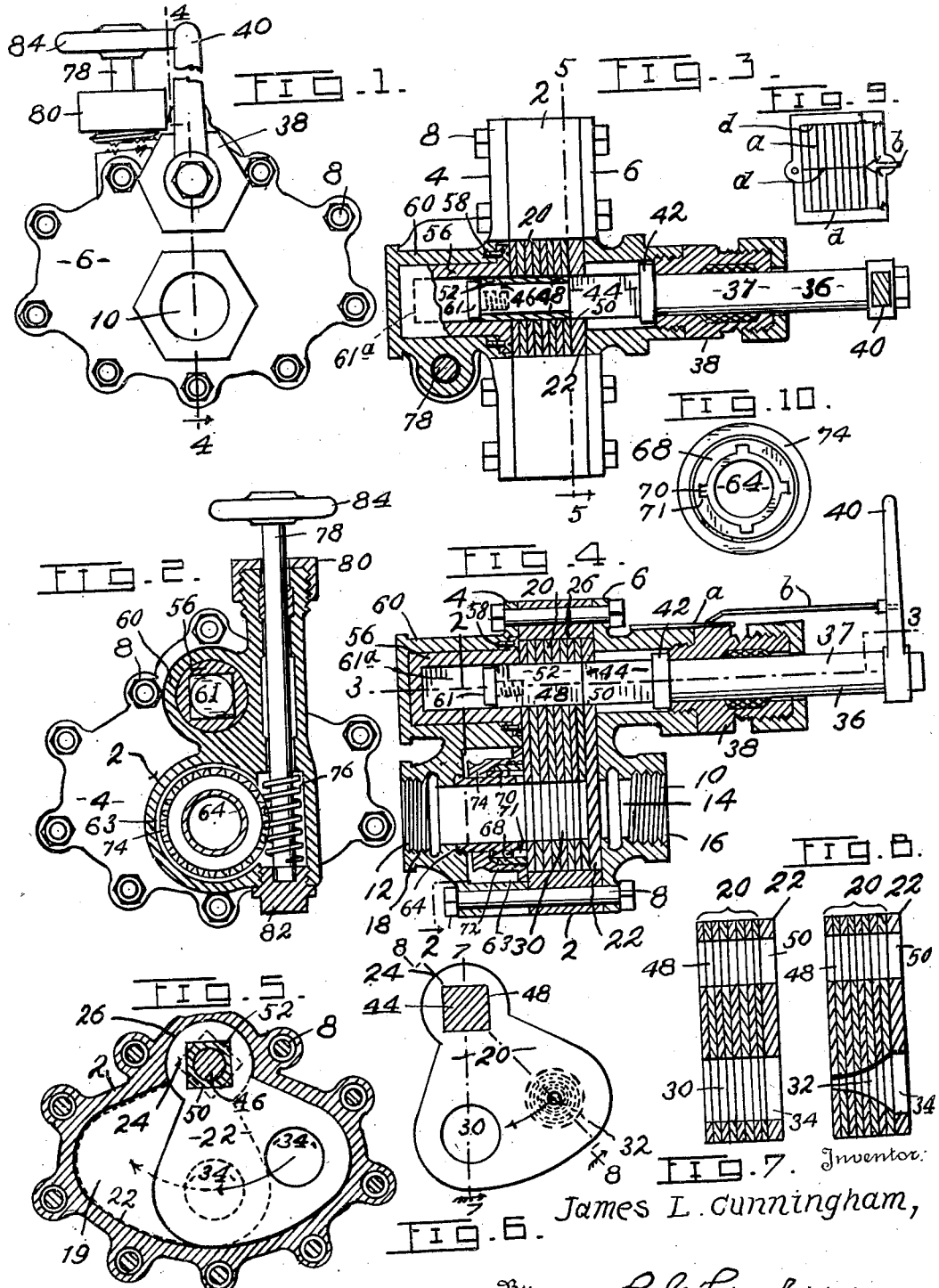

2,498,396

UNITED STATES PATENT OFFICE 2,498,396

VALVE

James L. Cunningham, Kansas City, Mo.

Application June 11, 1945, Serial No. 598,785

6 Claims. (Cl. 251—18)

My invention relates to new and useful improvements in valves for controlling the flow therethrough of water, steam, gas and other fluids under pressure.

One object of the invention is to provide a valve with a plurality of orifice plates, or equivalents thereof, all of which, except the orifice of a closure plate, are normally arranged in line with the inlet and the outlet of the valve, so that a full flow of fluid through the valve may be quickly obtained by simply opening the closure plate.

Another object of the invention is to provide a valve through which fluids may flow in a straight line and not be retarded as usual by having to traverse a more or less tortuous path through the valve.

Another object is to provide a valve having orifice plates which require no gaskets or other packing to prevent leakage and in which the edges of the orifices are protected by said plates from becoming worn or cut by fluids flowing therethrough under pressure.

A further obect is to provide a valve with a group of orifice plates having a second set of orifices which gradually diminish in size from the first to the last orifice so that the volume of fluid flowing through the valve can be quickly varied from minimum to maximum flow or vice versa. A further object is to provide a manual selector whereby the orifice plates can be readily controlled.

Other objects will hereinafter appear and in order that the invention may be fully understood, reference will now be had to the accompanying drawing, in which—

Fig. 1 is a broken rear elevation of the valve.

Fig. 2 is a front elevation of the valve with some of the parts in vertical section, on line 2—2 of Fig. 4.

Fig. 3 is a top plan view with some of the parts in horizontal section, taken on line 3—3 of Fig. 4.

Fig. 4 is a vertical section, taken on line 4—4 of Fig. 1.

Fig. 5 is a cross section of the valve on line 5—5 of Fig. 3, with some parts omitted.

Fig. 6 is a front elevation of a group of orifice plates with a selector therefor in cross section.

Fig. 7 is a vertical section of the group of orifice plates, on lines 7—7 of Fig. 6, with the selector omitted.

Fig. 8 is a section of the group of orifice plates, on line 8—8 of Fig. 6, with the selector omitted.

Fig. 9 is a detail of a scale and pointer.

Fig. 10 is a detail.

Referring in detail to the different parts, 2 designates the body of the valve which is closed at its ends by front and rear face plates 4 and 6, respectively, held in assembly with the body 2 by a plurality of fastening means, such for example, as bolts 8. The face plates 4 and 6 are provided with an inlet 10 and outlet 12, respectively in axial alinement with a passageway 14 in the valve body 2. The inlet and outlet 10 and 12 have internal threads 16 and 18 for connection to an inlet pipe and an outlet pipe, respectively, not shown.

Operably mounted within a chamber 19 in the body of the valve, Fig. 5, is a group of orifice plates 20, and an initial or closure orifice plate 22, which latter is arranged next to the inlet 10. The plates 20 and 22 are preferably of segmental form and provided with reduced segmental upper ends 24 adapted to operate in a seat 26 in the upper portion of the chamber 19, which latter is of such size as to permit the plates 20 and 22 to swing as indicated by the dotted lines and the arrow, Fig. 5. Each plate in group 20 has an orifice 30 of about the same diameter as the inlet 10 and outlet 12, respectively. The orifices 30 are so located in the group of plates 20 that they may be brought into axial alinement with the inlet and outlet 10 and 12, respectively, Fig. 4, by shifting the plates 20 to the position disclosed by Fig. 6. The group of plates 20 also have a series of orifices 32 which progressively taper from the inlet orifice to the outlet orifice, as shown by Figs. 6 and 8. The closure plate 22 has only one orifice 34 and it may be alined with orifices 30, or 32, as will presently appear.

The group of plates 20 and the closure plate 22 are controlled by a selector 36, preferably arranged in the form of a stem extending through a stuffing-box 38, at the upper rear portion of the valve body. The outer end of the selector 36 is provided with a handle 40 whereby it may be slid inwardly or outwardly, or turned axially. The selector 36 varies in shape from one end to the other, it being preferably of cylindrical form 37 from the handle 40 to and including a fixed collar 42, from which it extends in rectangular form as indicated at 44, and finally terminates in a reduced cylindrical portion 46, Figs. 3 and 5. The inward and outward movements of the selector 36 are checked by the collar 42 contacting the closure plate 22 or the inner end of the stuffing-box 38, respectively. The rectangular portion 44 is equal in length to the thickness of the group of plates 20, plus the thickness of the closure plate 22, and is adapted to slidably fit in correspondingly shaped rectangular openings 48 and 50 in the central part of the segmental upper ends 24 of the plates 20 and 22, respectively, for a purpose that will presently appear. The reduced cylindrical portion 46 of the selector operates in the cylindrical bore of a sleeve 52 which has a rectangular outer surface corresponding in shape to the rectangular portion 44 of the selector and is of sufficient length to reach from the rectangular portion 44 into the interior of a bushing 56 fixed by suitable means such as screws 58 in a tubular extension 60 at the upper portion of the front face plate 4. The sleeve 52 is held in place upon the selector by a screw threaded in the adjacent end of the selector and provided with a circular head 61, overlapping the adjacent end of the sleeve, Figs. 2, 3 and 4. The sleeve 52 is held from turning axially by its rectangular outer surface which is slidable longitudinally in the correspondingly shaped bore 61a of the bushing 56 and the openings 48. When in the position shown by Figs. 3 and 4, the sleeve 52 holds the group of plates 20 in open position with the orifices 30 alined with the inlet and outlet 10 and 12, respectively.

The position of the selector relative to the orifice plates 20 and 22 is readily determined by a scale a and pointer b, respectively. The scale, Fig. 9, discloses the graduations which may be inscribed on a suitable portion of the valve or on a separate plate secured to the valve, as in the present instance. The graduations include transverse lines c equal in number to the plates and having an initial space equal to the thickness of the closure plate 22 and the remainder equal to the thickness of the plates 20, respectively, so that when the selector 36 is moved inward or outward the position of the abutting ends of the rectangular portion 44 and the sleeve 52 relative to the plates can be readily determined. The scale also has parallel longitudinal lines d to cooperate with the pointer b in indicating the extent of axial turning of the selector 36.

In order to prevent leakage between the orifice plates 20 and 22, respectively, when gas or liquid is flowing therethrough, I provide pressure means to force said plates firmly against each other and the rear face plate 6 of the valve. Said means is located in a chamber 63 in the valve casing and comprises a stationary tubular guide member 64 surrounding the outlet 12 and threaded at one end in the body of the valve, Fig. 4.

Slidably mounted upon the tubular guide member 64 is a tubular pressure member 68 which bears against the face of the adjacent orifice plate 20 and is held from rotation upon the tubular guide member 64 by parallel lugs 70 formed upon the latter and projecting into grooves 71 in the pressure member 68. The tubular pressure member 68 is threaded in the hub 72 of a worm wheel 74 mounted for rotation upon the guide member 64 and adapted to be rotated by a worm 76 having a stem 78 extending outwardly through the upper potrion of a stuffing box 80 at the upper front part of the valve. The lower end of the worm 76 is journaled in a recess in a step bearing 82 threaded in the lower portion of the body of the valve, Fig. 2. The upper outer end of the stem 78 is provided with a hand-wheel 84 whereby it can be rotated to operate the worm gear and thereby force the pressure member 68 inward or outward.

Briefly the operation is as follows: When a full flow of fluid through the valve is desired, pressure on the orifice plates 20 and the closure plate 22 is relieved by turning the worm gearing 72, 74 to slightly retract the pressure member 68. As the group of plates 20 have their orifices 30 normally in line with the inlet and outlet 10 and 12, respectively, and the inner end of the rectangular portion 44 of the selector 36 is normally in engagement with the closure plate 22, Fig. 4, the valve may be fully opened by turning the selector 36 axially to swing the closure plate 22 from the full line position to the dotted line position, Fig. 5, and thus carry the orifice 34 into alinement with the group of orifices 30. The worm gearing 76, 74 is then manipulated to force the pressure member 68 against the face of the adjacent orifice plate 20 and firmly press the orifice plates 20 and 22 against each other to prevent leakage between the plates. If it is desired to reduce the flow through the valve to a minimum the selector 36 is moved inward from the position disclosed by Fig. 4, to engage the entire group of plates 20 and push the sleeve 52 from the openings 48. The selector is then turned axially to swing the plates 20 and 22 to the left, Fig. 6, until the orifices 32 and 34 are in alinement with the inlet 10 and the outlet 12. If a greater flow is desired the selector is pushed inward only far enough to engage and turn the first two or three plates 20, so that the remainder of said plates may be held in fully open position by the sleeve 52. The foregoing operations of the selector 36 may be accurately carried out by aid of the pointer a and scale b.

While I have illustrated a preferred form of the valve I do not wish to be limited to the precise form shown, but desire to avail myself of such variations and modifications as fall within the scope of the invention as claimed.

Having thus described my invention, what I claim and desire to secure by Letters Patent, is:

1. A valve comprising a casing having an inlet and an outlet, a closure plate operably mounted in the casing and provided with an orifice adapted to register with the inlet, an orifice plate operably mounted in the casing and provided with two spaced orifices of unequal size, and manually controlled selective means rotatably and slidably mounted in the casing and engaging the closure plate to adjust it to closed or open position independently of the orifice plate, said selective means also being adapted to be slid into engagement with the orifice plate and operate it simultaneously with the closure plate to carry either of its orifices into registery with the inlet opening.

2. A valve comprising a casing having an inlet and an outlet, a closure plate operably mounted in the casing and provided with an orifice adapted to register with the inlet, a group of orifice plates operably mounted in the casing and provided with a group of orifices of equal size and another group of orifices which tapers from front to rear of the group, and manually controlled selective means rotatably and slidably mounted in the casing and engaging the closure plate to adjust it to closed or open position independently of the orifice plates, said selective means also being adapted to be slid into engagement with any number of the orifice plates and operate them simultaneously with the closure plate to carry either their orifices of equal size or their tapered orifices into registry with the inlet opening.

3. A valve comprising a casing having an inlet and an outlet, a closure plate operably mounted in the casing and provided with an orifice adapted to register with the inlet, a group of orifice plates operably mounted in the casing and provided with a group of orifices of equal size and another group of orifices which tapers from front to rear of the group, said plates having alined angular openings, a member slidably mounted in said alined angular openings and corresponding in shape thereto, means for preventing rotation of said member, and manually controlled selective means rotatably and slidably mounted in the casing and engaging the closure plate to adjust it to closed or open position independently of the orifice plate, said selective means also being adapted to be slid into engagement with any number of the orifice plates and operate them simultaneously with the closure plate to carry either their orifices of equal size or their tapered orifices into registry with the inlet opening.

4. A valve comprising a casing having an inlet and an outlet, a group of plates operably mounted in said casing and provided with two sets of orifices either set of which is adapted to register with the inlet and the outlet and one set of which progressively tapers towards the outlet, and selective means operably mounted in the casing whereby any desired number of plates may be adjusted independently of the remainder of the group.

5. A valve comprising a casing having an inlet and an outlet, a group of plates operably mounted in said casing and provided with two sets of orifices either set of which is adapted to register with the inlet and the outlet and one set of which progressively tapers towards the outlet, said group of plates also having alined openings, and selective means rotatably and slidably mounted in the casing and the alined openings whereby any desired number of plates may be adjusted independently of the remainder of the group.

6. A valve comprising a casing having an inlet and an outlet, a group of plates operably mounted in said casing and provided with two sets of orifices either set of which is adapted to register with the inlet and the outlet and one set of which progressively tapers towards the outlet, said group of plates also having an alined set of angular openings, an angular sleeve slidable in said angular openings, a selector slidably and rotatably mounted in the casing and having a reduced cylindrical portion rotatably mounted in the sleeve and an angular portion slidable in the angular openings whereby any desired number of plates may be engaged and adjusted relative to the companion blades.

JAMES L. CUNNINGHAM.

REFERENCES CITED

The following references are of record in the file of this patent:

UNITED STATES PATENTS

| Number | Name | Date |
|---|---|---|
| 1,097,977 | James | May 26, 1914 |
| 1,599,168 | Duncan | Sept. 7, 1926 |
| 1,609,894 | Trent | Dec. 7, 1926 |